United States Patent
Um et al.

(10) Patent No.: US 11,275,279 B2
(45) Date of Patent: Mar. 15, 2022

(54) LIQUID CRYSTAL DISPLAY PANEL AND MANUFACTURING METHOD THEREOF

(71) Applicant: TCL CHINA STAR OPTOELECTRONICS TECHNOLOGY CO., LTD., Guangdong (CN)

(72) Inventors: Yoonsung Um, Guangdong (CN); Kaili Qu, Guangdong (CN); Ziqi Liu, Guangdong (CN); Chuwei Liang, Guangdong (CN); Lintao Liu, Guangdong (CN); Ting Li, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/970,956

(22) PCT Filed: Jul. 10, 2020

(86) PCT No.: PCT/CN2020/101328
§ 371 (c)(1),
(2) Date: Aug. 19, 2020

(87) PCT Pub. No.: WO2021/196442
PCT Pub. Date: Oct. 7, 2021

(65) Prior Publication Data
US 2021/0302791 A1    Sep. 30, 2021

(30) Foreign Application Priority Data
Mar. 31, 2020  (CN) .......................... 202010245623.0

(51) Int. Cl.
*G02F 1/1343* (2006.01)
*G02F 1/1337* (2006.01)
*G02F 1/1362* (2006.01)

(52) U.S. Cl.
CPC .. G02F 1/134309 (2013.01); G02F 1/133753 (2013.01); G02F 1/136286 (2013.01);
(Continued)

(58) Field of Classification Search
None
See application file for complete search history.

(56) References Cited

U.S. PATENT DOCUMENTS 6,512,569 B1 * 1/2003 Acosta ................. G02F 1/1395
349/181
7,342,629 B2 * 3/2008 Yoshida ............ G02F 1/133555
349/130
(Continued)

FOREIGN PATENT DOCUMENTS

| CN | 103226271 A | 7/2013 |
| CN | 107490912 A | 12/2017 |
| CN | 109031822 A | 12/2018 |

*Primary Examiner* — Ryan Crockett
(74) *Attorney, Agent, or Firm* — The Roy Gross Law Firm, LLC; Roy Gross (57) ABSTRACT

The present application provides a liquid crystal display panel and a method of manufacturing the same. The liquid crystal display panel includes a pixel electrode and liquid crystals, wherein the pixel electrode includes a middle region and a peripheral region located at a periphery of the middle region, the liquid crystals disposed corresponding to the middle region have a first pretilt angle, the liquid crystals disposed corresponding to the peripheral region have a second pretilt angle, and the first pretilt angle is greater than the second pretilt angle.

17 Claims, 8 Drawing Sheets

(52) U.S. Cl.
CPC .. *G02F 1/133761* (2021.01); *G02F 1/136218* (2021.01); *G02F 2201/123* (2013.01)

(56) References Cited

U.S. PATENT DOCUMENTS

| | | | | |
|---|---|---|---|---|
| 9,470,934 | B2* | 10/2016 | Ryu | G02F 1/133707 |
| 10,222,659 | B2* | 3/2019 | Lee | G02F 1/133707 |
| 2003/0086044 | A1* | 5/2003 | Inoue | G02F 1/134363 |
| | | | | 349/141 |
| 2003/0193625 | A1* | 10/2003 | Yoshida | G02F 1/134336 |
| | | | | 349/43 |
| 2005/0179844 | A1* | 8/2005 | Roosendaal | G02F 1/134309 |
| | | | | 349/139 |
| 2011/0199550 | A1* | 8/2011 | Fan | G02F 1/134309 |
| | | | | 349/33 |
| 2012/0044446 | A1* | 2/2012 | Hara | G02F 1/134309 |
| | | | | 349/139 |
| 2015/0234240 | A1 | 8/2015 | Tae et al. | |
| 2016/0377929 | A1* | 12/2016 | Lim | G02F 1/134309 |
| | | | | 349/43 |
| 2017/0219889 | A1* | 8/2017 | Zhong | G02F 1/134309 |
| 2020/0033680 | A1* | 1/2020 | Ye | G02F 1/136209 |

* cited by examiner

FIG. 7 applying an electric field to the liquid crystals in the middle region greater than an electric field applied to the liquid crystals in the peripheral region, to make the liquid crystals in the middle region have a pretilt angle greater than the liquid crystals in the peripheral region. ⎯S101 fixing the pretilt angle of the liquid crystals in the middle region and the pretilt angle of the liquid crystals in the peripheral region. ⎯S102

FIG. 8

LIQUID CRYSTAL DISPLAY PANEL AND MANUFACTURING METHOD THEREOF

BACKGROUND OF INVENTION

Field of Invention

The present application relates to a field of display technology, in particular to a liquid crystal display panel and a manufacturing method thereof.

Description of Prior Art

Figure 1:
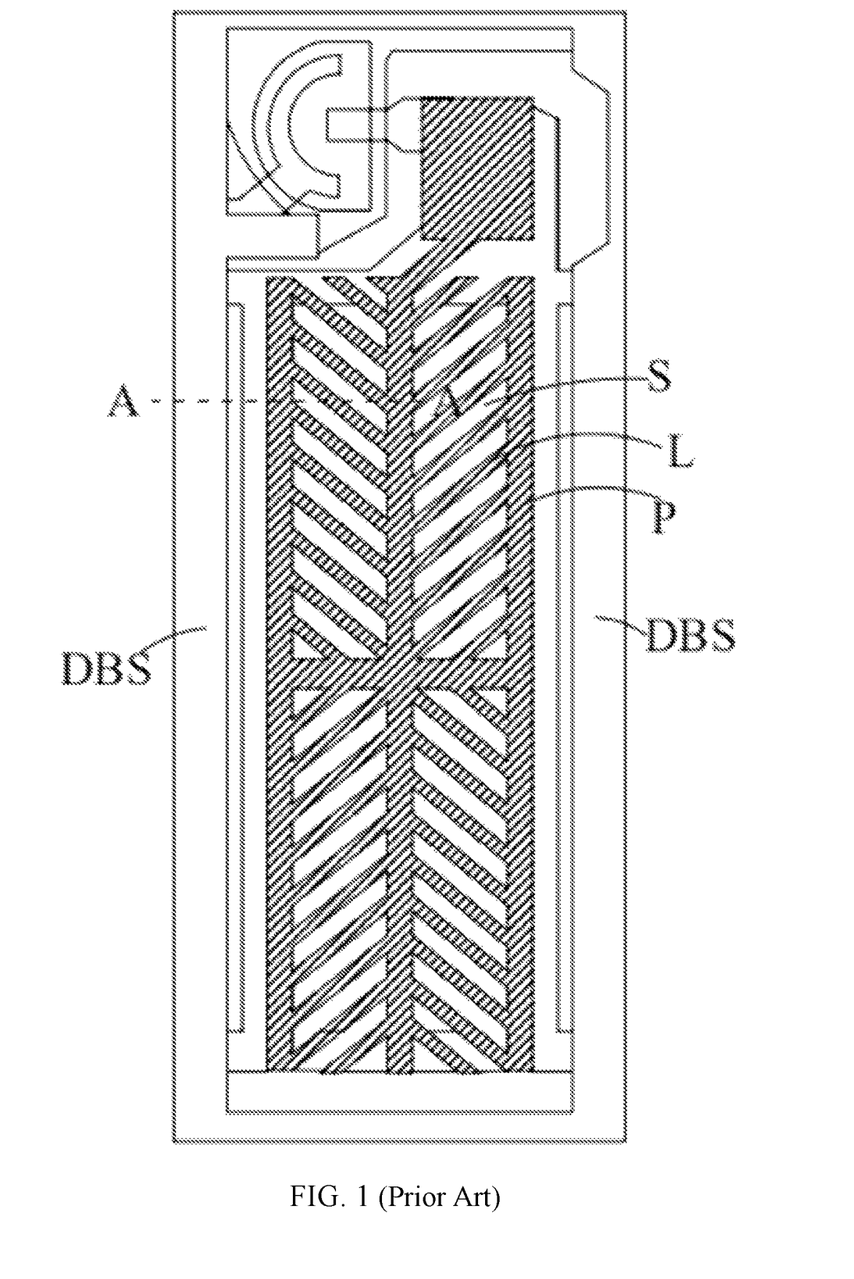
FIG. 1 is a top view of a conventional liquid crystal display panel.
Figure 2:
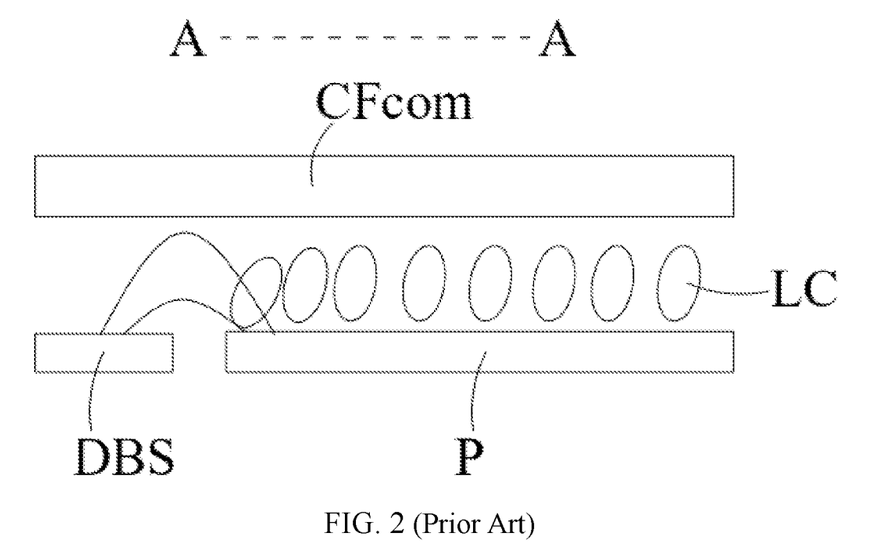
FIG. 2 is a schematic cross-segmental view of the liquid crystal display panel taken along line A-A of FIG. 1.

Referring to FIGS. 1 and 2, FIG. 1 is a top view of a conventional liquid crystal display panel, and FIG. 2 is a schematic cross-segmental view of the liquid crystal display panel taken along line A-A of FIG. 1. The liquid crystal display panel includes a pixel electrode P, a light shielding electrode DBS, a common electrode CFcom, and liquid crystals LC. The pixel electrode P and the light shielding electrode DBS are located on an array substrate (not shown) of the liquid crystal display panel, and the common electrode CFcom is located on a color filter substrate (not shown) of the liquid crystal display panel. The pixel electrode P and the light-shielding electrode DBS are disposed opposite to the common electrode CFcom, and liquid crystals LC are located between the pixel electrode P and the common electrode CFcom. The pixel electrode P includes a vertical electrode and a horizontal electrode, and the vertical electrode and the horizontal electrode are perpendicular to each other to divide the pixel electrode P into four domains. Each of the domains includes a branch electrode L extending from the vertical electrode or the horizontal electrode. Widths of the branch electrodes L in the four domains are the same, and widths of gaps S between adjacent ones of the branch electrodes L are the same.

During a normal driving process of the liquid crystal display panel, generally, a voltage of the light-shielding electrode DBS and a voltage of the common electrode CFcom remain consistent. In a pixel area, the liquid crystals LC rapidly tilt under a combined action of the electric field formed between the light-shielding electrode DBS and the pixel electrode P and the electric field formed between the common electrode CFcom and the pixel electrode P. As a distance between the pixel electrode P and the DBS electrode increases from outside of the pixel electrode P to inside of the pixel electrode P, the liquid crystals LC are applied a weakened force of original translation the electric field formed between the light-shielding electrode DBS and the pixel electrode P, causing the liquid crystals LC inside the pixel electrode P to slowly tilt in a direction of a pretilt angle only under an action of an electric field between the pixel electrodes P the common electrode CFcom, so the response sequence of the liquid crystals LC is that the liquid crystals LC in the peripheral region of the pixel electrode P moves fast, and then the liquid crystals LC are tilted from the outside of the pixel electrode P to the inside of the pixel electrode P. When the pretilt angle of the liquid crystal display panel is small, the liquid crystals LC inside the pixel electrode P have a high degree of chaos and a slow response.

Therefore, there is a need to propose a technical solution to solve the problem of slow response of the liquid crystals inside the pixel electrode P caused by difference in a force of the electric field formed between the pixel electrode P and the light-shielding electrode DBS on a peripheral region of the liquid crystals and an internal area of the pixel electrode P.

SUMMARY OF INVENTION

An object of the present application is to provide a liquid crystal display panel and a method of manufacturing the same. The liquid crystal display panel can improve the response time of the liquid crystals in the middle region of the pixel electrode, avoiding the problem of slow response caused by a small force of the electric field formed between the pixel electrode and the light-shielding electrode on of the liquid crystals in the middle region of the pixel electrode during the liquid crystal display panel is driven in the conventional technology.

In order to achieve the above object, the present application provides a liquid crystal display panel, including a pixel electrode and liquid crystals, wherein the pixel electrode includes a middle region and a peripheral region located at a periphery of the middle region, the liquid crystals disposed corresponding to the middle region have a first pretilt angle, the liquid crystals disposed corresponding to the peripheral region have a second pretilt angle, and the first pretilt angle is greater than the second pretilt angle.

In the liquid crystal display panel, a plurality of first branch electrodes are provided in the middle region of the pixel electrode, a plurality of second branch electrodes are provided in the peripheral region of the pixel electrode, and a width of each of the first branch electrodes is larger than a width of each of the second branch electrodes.

In the liquid crystal display panel, a ratio of a sum of areas of the plurality of first branch electrodes to a sum of areas of the plurality of second branch electrodes is greater than 0 and less than 1.

In the liquid crystal display panel, the pixel electrode includes a vertical electrode and a horizontal electrode perpendicular to the vertical electrode, and each of the first branch electrodes extends from the horizontal electrode or/and the vertical electrode.

In the liquid crystal display panel, the plurality of first branch electrodes include a first group of the first branch electrodes and a second group of the first branch electrodes, each of the first group of the first branch electrodes extends outward from a center of the pixel electrode, and each of the second group of the first branch electrodes extends from the first group of the first branch electrodes.

In the liquid crystal display panel, the first group of the first branch electrodes includes four first branch electrodes extending outward from the center of the pixel electrode, and an angle between adjacent ones of the first group of the first branch electrodes is equal to 90 degrees.

In the liquid crystal display panel, the middle region and the peripheral region of the pixel electrode are divided into a plurality of domains, each of the first branch electrodes located in a same one of the domains extends to form at least one of the second branch electrodes, and the second branch electrodes extending from the first branch electrodes are parallel to corresponding ones of the first branch electrodes.

In the liquid crystal display panel, the liquid crystal display panel further includes a light-shielding electrode, wherein the light-shielding electrode and the pixel electrode are disposed on a same plane and located on opposite sides of the pixel electrode, and the light-shielding electrode includes a concave edge close to the pixel electrode and recessed relative to the pixel electrode.

In the liquid crystal display panel, the pixel electrode includes a convex edge close to the light-shielding electrode and matching the concave edge.

In the liquid crystal display panel, the liquid crystal display panel further includes a data line located on a side of the light-shielding electrode, the data line is disposed corresponding to the light-shielding electrode, and an orthographic projection of the data line on the liquid crystal display panel is located in an orthographic projection of the light-shielding electrode on the liquid crystal display panel.

In the liquid crystal display panel, the concave edge includes a first inclined straight line segment, a second inclined straight line segment, and a first circular arc segment connecting the first inclined straight line segment and the second inclined straight line segment, the first inclined linear segment and the second inclined linear segment respectively correspond to opposite ends of the pixel electrode, and the first circular arc segment corresponds to the middle region of the pixel electrode.

In the liquid crystal display panel, an angle between the first inclined straight line and a horizontal line or an angle between the second inclined straight line segment and the horizontal line is greater than or equal to 45 degrees and less than 90 degrees.

A method of manufacturing a liquid crystal display panel, wherein the liquid crystal display panel includes a pixel electrode and liquid crystals, the pixel electrode includes a middle region and a peripheral region located at a periphery of the middle region, and the manufacturing method includes the following steps:

applying an electric field to the liquid crystals in the middle region greater than an electric field applied to the liquid crystals in the peripheral region, to make the liquid crystals in the middle region have a pretilt angle greater than the liquid crystals in the peripheral region; and fixing the pretilt angle of the liquid crystals in the middle region and the pretilt angle of the liquid crystals in the peripheral region.

In the method of manufacturing the liquid crystal display panel, a plurality of first branch electrodes are provided in the middle region of the pixel electrode, a plurality of second branch electrodes are provided in the peripheral region of the pixel electrode, and a width of each of the first branch electrodes is larger than a width of each of the second branch electrodes.

In the method of manufacturing the liquid crystal display panel, a ratio of a sum of areas of the plurality of first branch electrodes to a sum of areas of the plurality of second branch electrodes is greater than 0 and less than 1.

In the method of manufacturing the liquid crystal display panel, the pixel electrode includes a vertical electrode and a horizontal electrode perpendicular to the vertical electrode, and each of the first branch electrodes extends from the horizontal electrode or/and the vertical electrode.

In the method of manufacturing the liquid crystal display panel, the plurality of first branch electrodes include a first group of the first branch electrodes, the first group of the first branch electrodes includes four first branch electrodes extending outward from the center of the pixel electrode, and an angle between adjacent ones of the first group of the first branch electrodes is equal to 90 degrees.

In the method of manufacturing the liquid crystal display panel, the liquid crystal display panel further includes a light-shielding electrode, the light-shielding electrode and the pixel electrode are disposed on a same plane and located on opposite sides of the pixel electrode, and the light-shielding electrode includes a concave edge close to the pixel electrode and recessed relative to the pixel electrode.

In the method of manufacturing the liquid crystal display panel, the pixel electrode includes a convex edge close to the light-shielding electrode and matching the concave edge.

In the method of manufacturing the liquid crystal display panel, the concave edge includes a first inclined straight line segment, a second inclined straight line segment, and a first circular arc segment connecting the first inclined straight line segment and the second inclined straight line segment, the first inclined linear segment and the second inclined linear segment respectively correspond to opposite ends of the pixel electrode, and the first circular arc segment corresponds to the middle region of the pixel electrode.

The present application provides a liquid crystal display panel and a method of manufacturing the same. The liquid crystal display panel includes a pixel electrode and liquid crystals, wherein the pixel electrode includes a middle region and a peripheral region located at a periphery of the middle region, the liquid crystals disposed corresponding to the middle region have a first pretilt angle, the liquid crystals disposed corresponding to the peripheral region have a second pretilt angle, and the first pretilt angle is greater than the second pretilt angle. By making the pretilt angle of the liquid crystals in the middle region of the pixel electrode larger than the pretilt angle of the liquid crystals in the peripheral region, the liquid crystals in the middle region of the pixel electrode can be stabilized faster when the liquid crystal display panel is driven, and the response time of the liquid crystals in the middle region of the pixel electrode is improved, avoiding the problem of slow response caused by a small force of the electric field formed between the pixel electrode and the light-shielding electrode on of the liquid crystals in the middle region of the pixel electrode during the liquid crystal display panel is driven in the conventional technology.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

The present application provides a liquid crystal display panel. The liquid crystal display panel includes a light-shielding electrode, a pixel electrode, a common electrode, and liquid crystals. The light-shielding electrode and the pixel electrode are located on the same side of the common electrode and are both arranged opposite to common electrode, the light-shielding electrode is located on opposite sides of the pixel electrode, and the liquid crystals are located between the pixel electrode and the common electrode.

The pixel electrode has a middle region and a peripheral region located at a periphery of the middle region, the liquid crystals disposed corresponding to the middle region have a first pretilt angle, the liquid crystals disposed corresponding to the peripheral region have a second pretilt angle, and the first pretilt angle is greater than the second pretilt angle.

In the liquid crystal display panel of the present application, by making the pretilt angle of the liquid crystals provided in the middle region of the corresponding pixel electrode greater than the pretilt angle of the liquid crystals provided in the peripheral region of the corresponding pixel electrode, the time for the liquid crystals in the middle region of the pixel electrode to reach the target pretilt angle is shortened, which is beneficial to the liquid crystals in the middle region of the pixel electrode to be stabilized faster when the liquid crystal display panel is driven by an operation voltage, thereby improve the response time of the liquid crystals in the middle region of the pixel electrode.

In some embodiments, a plurality of first branch electrodes are provided in the middle region of the pixel electrode, a plurality of second branch electrodes are provided in the peripheral region of the pixel electrode, and a width of each of the first branch electrodes is larger than a width of each of the second branch electrodes. On the one hand, in a liquid crystal alignment process of liquid crystal display panel, the width of the first branch electrode in the middle region of the pixel electrode is larger than the width of the second branch electrode in the peripheral region of the pixel electrode, so that the electric field force applied to the liquid crystals in the middle region of the pixel electrode is greater than the electric field force applied to the liquid crystals in the peripheral region of the pixel electrode, and the pretilt angle formed by the liquid crystals in the middle region of the pixel electrode is relative great. On the other hand, when the liquid crystal display panel is driven by an operation voltage, the force of the electric field formed between the first branch electrode and the common electrode applied to the liquid crystals with the first pretilt angle in the middle region of the pixel electrode is greater than the force of the electric field formed between the second branch electrode and the common electrode applied to the liquid crystals with the second pretilt angle in the peripheral region of the pixel electrode, which is more conducive to stabilizing the liquid crystals in the middle region of the pixel electrode earlier, and further improves the response time, such the problem of slow response caused by a small force of the electric field formed between the pixel electrode and the light-shielding electrode on of the liquid crystals in the middle region of the pixel electrode during the liquid crystal display panel is driven in the conventional technology can be avoided.

In some embodiments, a ratio of a sum of areas of the plurality of first branch electrodes to a sum of areas of the plurality of second branch electrodes is greater than 0 and less than 1, such that the width and the gap width of the branch electrodes are prevented from being sensitive to the phenomenon of uneven light (Mura) when the liquid crystal display panel displays due to changes in the manufacturing process. Specifically, a slope of the voltage-transmittance (V-T) curve is controlled to avoid the steep slope of the voltage-transmittance (V-T) curve.

In some embodiments, the ratio of the sum of the areas of the plurality of first branch electrodes to the sum of the areas of the plurality of second branch electrodes is greater than or equal to ⅓ and less than or equal to ½, which is more beneficial to prevent the width and the gap width of the branch electrodes from being sensitive to the phenomenon of uneven light (Mura) when the liquid crystal display panel displays due to changes in the manufacturing process. Specifically, the ratio of the sum of the areas of the plurality of first branch electrodes to the sum of the areas of the plurality of second branch electrodes is ⅓, 4/9, or ½.

In some embodiments, the pixel electrode includes a vertical electrode and a horizontal electrode perpendicular to the vertical electrode, and each of the first branch electrodes extends from the horizontal electrode or/and the vertical electrode. Part of the first branch electrodes are in a bar shape, and part of the first branch electrodes are in an irregular pattern such as a triangle. A first gap is defined between adjacent ones of the first branch electrodes.

In some embodiments, the plurality of first branch electrodes include a first group of the first branch electrodes and a second group of the first branch electrodes, each of the first group of the first branch electrodes extends outward from a center of the pixel electrode, and each of the second group of the first branch electrodes extends from the first group of the first branch electrodes.

In some embodiments, the first group of the first branch electrodes includes four first branch electrodes extending outward from the center of the pixel electrode, and an angle between adjacent ones of the first group of the first branch electrodes is equal to 90 degrees, so that the four first branch electrodes in the first group of first branch electrodes are distributed in a windmill shape, which can make the cross-shaped dark lines in the middle region of the pixel electrode become thinner during display, thereby improving the optical performance of the pixel electrode, thus more conducive to stabilizing the liquid crystals in the middle region earlier, compared with the cross-shaped electrode in the middle of the traditional pixel electrode.

In some embodiments, the middle region and the peripheral region of the pixel electrode are divided into a plurality of domains, each of the first branch electrodes located in a same one of the domains extends to form at least one of the second branch electrodes, and the second branch electrodes extending from the first branch electrodes are parallel to corresponding ones of the first branch electrodes.

In some embodiments, the pixel electrode is divided into a plurality of domains, part of the second branch electrode is disposed in the middle region, part of the second branch electrodes are disposed in the peripheral region, the second branch electrodes located in a same one of the domains are parallel, and a second gap is defined between adjacent ones of the second branch electrodes. A width of the second gap is equal to a width of the first gap.

In some embodiments, the light-shielding electrode and the pixel electrode are on the same plane, and the light-shielding electrode includes a concave edge close to the pixel electrode and recessed relative to the pixel electrode. Compared with the traditional light-shielding electrode, in which the inner side of the light-shielding electrode is straight, an inner side of the light-shielding electrode having a concave edge increases the boundary perimeter of the inner side of the light-shielding electrode, thereby increasing a range of action of the electric field formed by the light-shielding electrode and the pixel electrode on the liquid crystals, and under the combined effect of the electric field formed between the light-shielding electrode and the pixel electrode, the liquid crystals in a larger range (larger than the traditional peripheral region) will be poured faster, thereby further improving the response time of the liquid crystals.

In some embodiments, the pixel electrode includes a convex edge close to the light-shielding electrode and matching the concave edge. Compared with the conventional pixel electrode, in which the edge close to the light-shielding electrode is a straight edge, the convex edge matching the concave edge not only can increase the area of the pixel electrode to ensure the aperture ratio, but also further increases the action range of the electric field formed by the light-shielding electrode and the pixel electrode on the liquid crystals when the convex edge of the pixel electrode is designed to fit the concave edge of the light-shielding electrode, and a tilting speed of the liquid crystals in a larger range becomes faster, thereby further improving the response time of the liquid crystals.

In some embodiments, the liquid crystal display panel further includes a data line located on a side of the light-shielding electrode, the data line is disposed corresponding to the light-shielding electrode, and an orthographic projection of the data line on the liquid crystal display panel is located in an orthographic projection of the light-shielding electrode on the liquid crystal display panel, so as to play a light shielding role.

The liquid crystal display panel will be described below with reference to specific embodiments.

Embodiment 1

Figure 3:
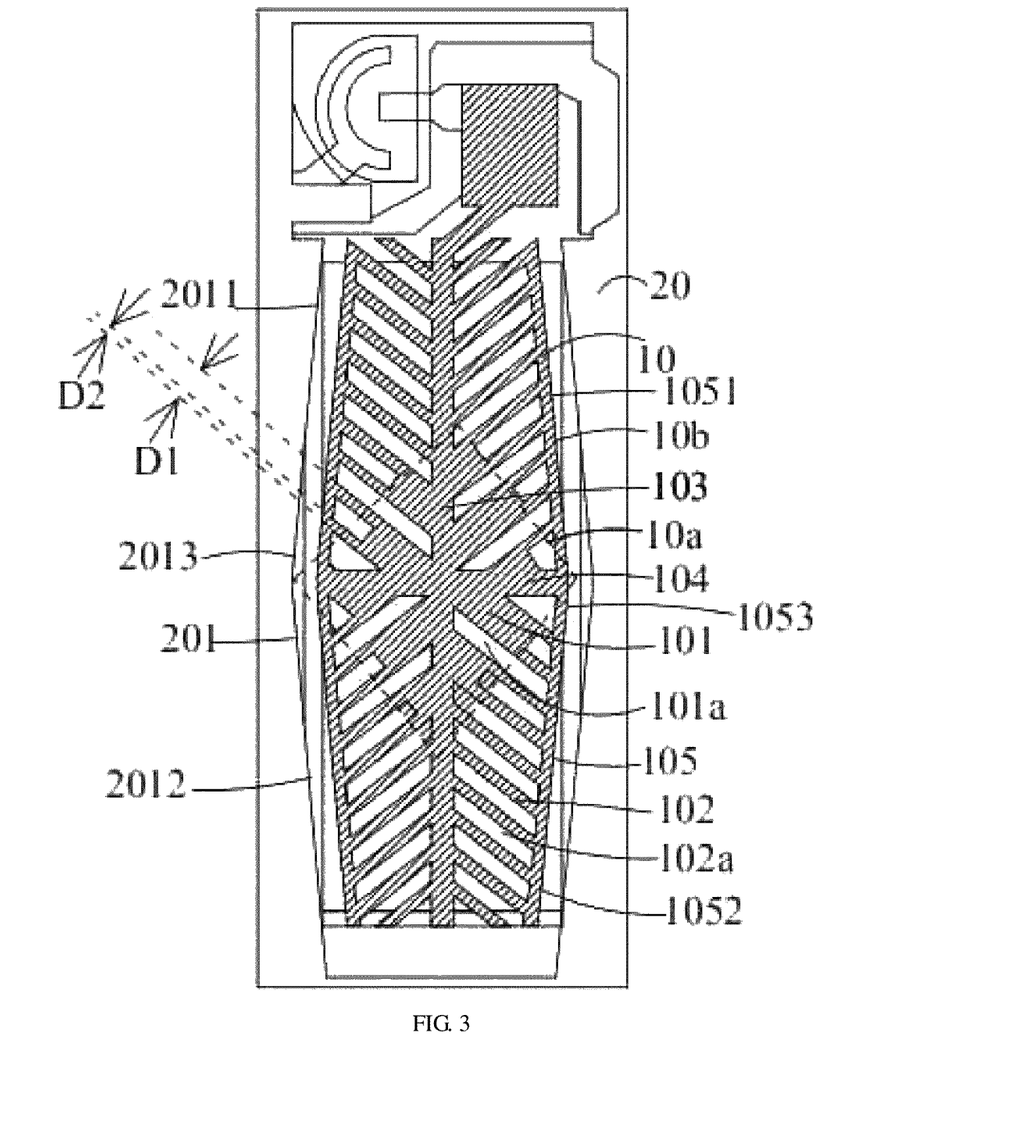
FIG. 3 is a top view of a liquid crystal display panel according to Embodiment 1 of the present application.

As shown in FIG. 3, FIG. 3 is a top view of the liquid crystal display panel of Embodiment 1 of the present application. The liquid crystal display panel includes an array substrate, a color filter substrate, and liquid crystals. The array substrate and the color filter substrate are oppositely arranged. The array substrate includes a pixel electrode 10 and a light-shielding electrode 20. The light-shielding electrode 20 and the pixel electrode 10 are disposed in a same layer, and the light-shielding electrode 20 is located on opposite sides of the pixel electrode 10. The color filter substrate includes a common electrode (not shown), and the common electrode is formed on the color filter substrate over the entire surface. The common electrode and the light-shielding electrode 20 may be electrically connected to each other by conductive glue. The light-shielding electrode 20 may independently input a signal, and use a separate signal source.

The pixel electrode 10 has a middle region 10a and a peripheral region 10b located at a periphery of the middle region 10a. The middle region 10a has a shape of a quadrangle, and may also have a shape of a circle, an ellipse, or an irregular pattern. A plurality of first branch electrodes 101 and a plurality of second branch electrodes 102 are provided in the middle region 10a of the pixel electrode 10, and a plurality of second branch electrodes 102 are provided in the peripheral region 10b of the pixel electrode 10. The pixel electrode 10 includes a vertical electrode 103 and a horizontal electrode 104 perpendicular to the vertical electrode 103. The vertical electrode 103 and the horizontal electrode 104 equally divide the pixel electrode 10 into four domains.

The plurality of first branch electrodes 101 corresponding to the middle region 10a of the pixel electrode 10 in each of the domains are arranged in parallel, and a first gap 101a is defined between adjacent ones of the first branch electrodes 101. The plurality of second branch electrodes 102 corresponding to the peripheral region 10b of the pixel electrode 10 in each of the domains are arranged in parallel, and a second gap 102a is defined between adjacent ones of the second branch electrodes 102. Each of the first branch electrodes 101 extends from the horizontal electrode 104 or/and the vertical electrode 103. Each of the first branch electrodes 101 located in a same one of the domains extends to form at least one of the second branch electrodes 102, and the second branch electrodes 102 extending from the first branch electrodes 101 are parallel to corresponding ones of the first branch electrodes 101. Specifically, each of most of the first branch electrodes 101 extend to form two second branch electrodes 102.

The second branch electrodes 102 are all strip-shaped. The plurality of second branch electrodes 102 have a same width D2. The width D2 of each of the second branch electrodes 102 is 1.5 µm to 3 µm. The widths of the second gaps 102a are equal. A sum of the width of each of the second branch electrodes 102 and the width of one of the second gaps 102a is 4.5 to 7 microns.

Most of the first branch electrodes 101 are strip-shaped, and a few of the first branch electrodes 101 are triangular. The width D1 of the first branch electrode 101 is greater than the width D2 of the second branch electrode 102, so that the force of the electric field formed between the first branch electrode 101 and the common electrode is greater than the force of the electric field formed between the second branch electrode 102 and the common electrode. Each of the widths D1 of most of the first branch electrodes 101 is equal to the sum of twice the width D2 of the second branch electrodes 102 and the width of the second gap 102a between adjacent ones of the second branch electrodes 102. The width of the first gap 101a is equal to the width of the second gap 102a. It can be understood that the width of the first branch electrode 101 may also be less than or equal to the sum of the width of one second branch electrode 102 and the width of one second gap 102a. The width of the first gap 101a may also be smaller than the width of the second gap 102a, so that the width D1 of the first branch electrode 101 is further increased.

The light-shielding electrode 20 and the common electrode are maintained in a state of no voltage difference, so that the liquid crystals between the light-shielding electrode 20 and the common electrode do not rotate, where is a region in a black state, to replace the black matrix for light shielding. The light shielding electrode 20 has a concave edge 201 that is close to the pixel electrode 10 and recessed relative to the pixel electrode 10. The concave edge 201 is an recessed arc segment, which is beneficial to increase the inner length of the light-shielding electrode 20 and thereby increase the range of action of the electric field formed between the light-shielding electrode 20 and the pixel electrode 10. In order to adapt to the exposure process, the concave edge 201 includes a first inclined straight line segment 2011, a second inclined straight line segment 2012, and a first circular arc segment 2013 connecting the first inclined straight line segment 2011 and the second inclined straight line segment 2012. The first inclined straight line segment 2011 and the second inclined straight line segment 2012 respectively correspond to opposite ends of the pixel electrode 10, and the first circular arc segment 2013 corresponds to the middle region 10a of the pixel electrode 10. An angle between the first inclined straight line 2011 and a horizontal line or an angle between the second inclined straight line segment 2012 and the horizontal line is greater than or equal to 45 degrees and less than 90 degrees, such as 60 degrees, 75 degrees, and 80 degrees, which is more conducive to increasing the range of action of the electric field formed between the light-shielding electrode 20 and the pixel electrode 10, and to ensure the aperture ratio.

The light shielding electrode 20 further includes a straight edge opposite to the concave edge 201, such that the width of each of the opposite ends of the light shielding electrode 20 is greater than the width of the middle of the light shielding electrode 20, and the width of the light shielding electrode 20 is greater than the width of the data line (not shown) to shield the data line. Specifically, the data line is located on the side of the light-shielding electrode 20 away from the common electrode, the data line is disposed corresponding to the light-shielding electrode 20, and the orthographic projection of the data line on the liquid crystal display panel is located in the orthographic projection of the light-shielding electrode on the liquid crystal display panel.

In order to increase the aperture ratio of the liquid crystals panel, the pixel electrode 10 has a convex edge 105 which is close to the light shielding electrode 20 and matches the concave edge 201. The convex edge 105 includes a third inclined straight segment 1051, a fourth inclined straight segment 1052, and a second circular arc segment 1053, and the second circular arc segment 1053 is connected to the third inclined linear segment 1051 and the fourth inclined linear segment 1052 therebetween. An angle between the third inclined straight segment 1051 and the horizontal line or an angle between the fourth inclined straight segment 1052 and the horizontal line is greater than or equal to 45 degrees and less than 90 degrees, such as 60 degrees, 75 degrees, and 80 degrees. The angle between the third inclined straight line 1051 and the horizontal line is equal to the angle between the first inclined straight line 2011 and the horizontal line, and the angle between the fourth inclined straight line 1052 and the horizontal line is equal to the angle between the second inclined straight line 2012 and the horizontal line, the angle between the third inclined straight line segment 1051 and the horizontal line is equal to the angle between the fourth inclined straight line segment 1052 and the horizontal line.

The distance between the pixel electrode 10 and the light-shielding electrode 20 is 3.5 μm to 4.5 μm, such as 4 μm, to maximize the aperture ratio, and the accuracy of the exposure process can achieve such a distance. The pixel electrode 10 and the light-shielding electrode 20 are made of transparent metal oxide, such as indium tin oxide.

Figure 4:
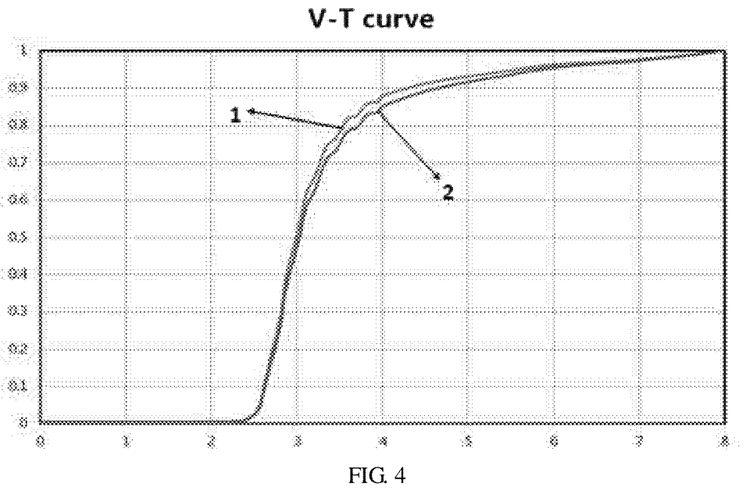
FIG. 4 is a simulation result of voltage-transmittance (V-T) curves of the pixel electrode shown in FIG. 1 and the pixel electrode shown in FIG. 3.

As shown in FIG. 4, FIG. 4 is a simulation result of the voltage-transmittance (V-T) curves of the pixel electrode shown in FIG. 1 and the pixel electrode shown in FIG. 3. During the test, curve 1 is the simulation result of the voltage-transmittance (V-T) of the pixel electrode shown in FIG. 1, and curve 2 is the simulation result of the voltage-transmittance (V-T) of the pixel electrode shown in FIG. 3. As shown in FIG. 4, compared with the voltage-transmittance (V-T) curve of the pixel electrode shown in FIG. 1, the voltage-transmittance (V-T) curve of the pixel electrode shown in FIG. 3 is gentler (smaller). When the width L of the branch electrode/the width S between the branch electrodes fluctuates due to the manufacturing process, the voltage-transmittance (V-T) curve of the pixel electrode shown in FIG. 3 is gentler, which can reduce impact on the width L of the branch electrode/the width S between the branch electrodes by the entire surface uniformity of the penetration rate due to fluctuations in the process, which improves the phenomenon of uneven brightness (mura).

Figure 5:
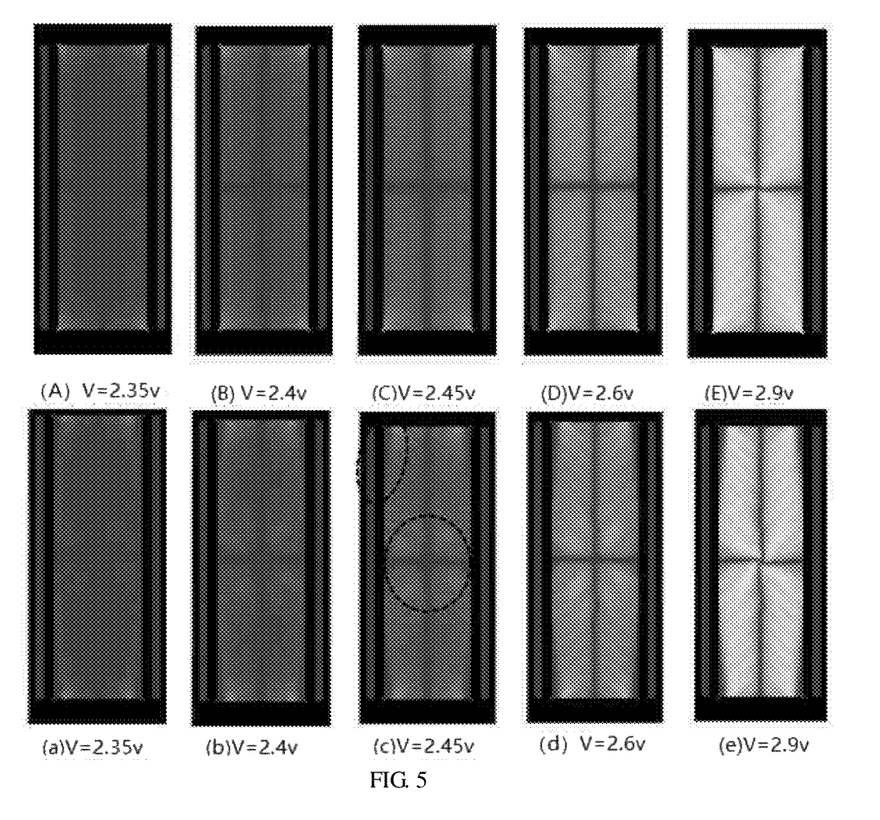
FIG. 5 is an optical performance diagram of medium and low gray levels of the pixel electrode shown in FIG. 1 and the pixel electrode shown in FIG. 3 under different voltages, wherein A-E is the optical performance diagram of the medium and low gray levels of the pixel electrode shown in FIG. 1 under different voltages, and a-e is the optical performance diagram of the medium and low gray levels of the pixel electrode shown in FIG. 3 under different voltages.

As shown in FIG. 5, FIG. 5 is an optical performance diagram of medium and low gray levels of the pixel electrode shown in FIG. 1 and the pixel electrode shown in FIG. 3 under different voltages. At low and medium gray levels, different areas (the middle region and the four corners) of the pixel electrode shown in FIG. 3 have different brightness, wherein the middle region of the pixel is brighter, indirectly reflecting that liquid crystals in the middle region of the pixel have a greater pretilt angle. The greater pretilt angle of the liquid crystals in the middle region of the pixel can help the LCD stabilize as soon as possible, thereby improving response time. In the pixel electrode shown in FIG. 1 and the pixel electrode shown in FIG. 3, the peripheral region of the pixel electrode near the light-shielding electrode is brighter, especially the four corners of the pixel electrode are relatively brighter, indicating that the liquid crystals are tilted to a greater extent, confirming the theory that a response sequence of the liquid crystals is that the liquid crystals in the peripheral region of the pixel electrode act fast and then the liquid crystals are tilted sequentially from outside to inside. Meanwhile, the pixel electrode shown in FIG. 3 has the light-shielding electrode whose boundary is in a larger proportion, so a brightening range of peripheral region of the pixel electrode shown in FIG. 3 is larger, where the liquid crystals response faster.

Embodiment 2

Figure 6:
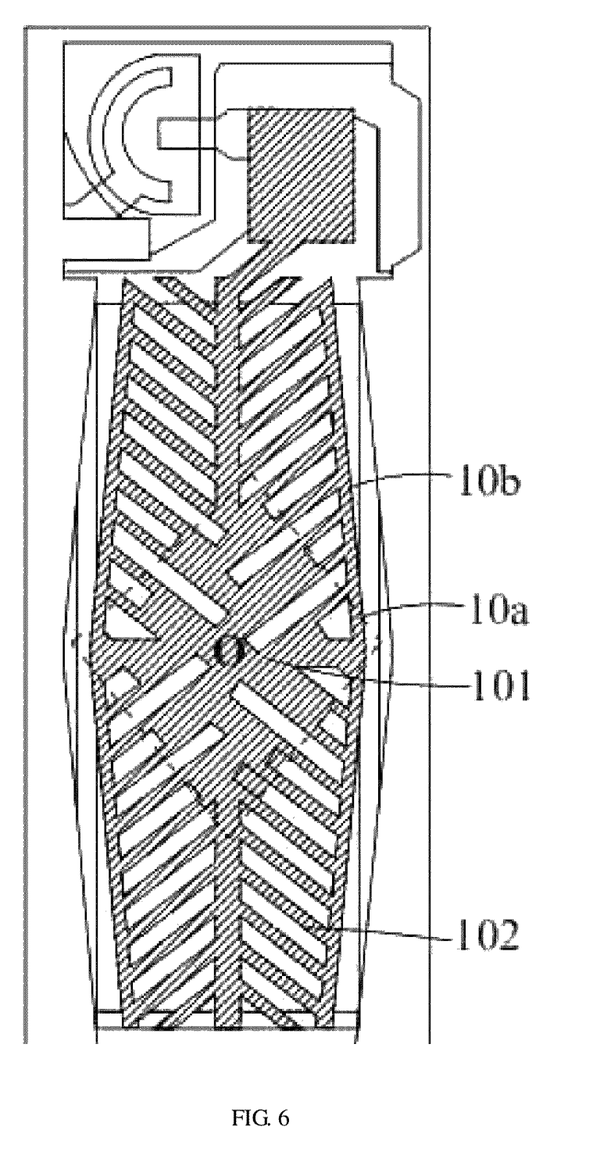
FIG. 6 is a top view of a liquid crystal display panel according to Embodiment 2 of the present application.

As shown in FIG. 6, FIG. 6 is a top view of a liquid crystal display panel according to Embodiment 2 of the present application. The liquid crystal display panel shown in FIG. 6 is substantially similar to the liquid crystal display panel shown in FIG. 3, except that the first branch electrodes in the middle region 10a of the pixel electrode 10 are distributed in a windmill shape. The plurality of first branch electrodes 101 include a first group of first branch electrodes, a second group of first branch electrodes, and a third group of first branch electrodes. Each of the first group of the first branch electrodes 101 extends outward from a center O of the pixel electrode 10, each of the second group of the first branch electrodes 101 extends from the first group of the first branch electrodes 101, and each of the third group of the first branch electrodes 101 extends from one of the second group of the first branch electrodes 101. It can be understood that a number of groups of the first branch electrodes is not limited to three groups.

Specifically, the first group of first branch electrodes includes four first branch electrodes 101 extending outward from the center O of the pixel electrode 10, and an angle between adjacent ones of the first group of the first branch electrodes 101 is a predetermined angle, for example, 90 degrees. Each of the second group of the first branch electrode 101 extends from one of the first group of first branch electrodes and has a first predetermined angle with the first group of the first branch electrodes 101, for example, 90 degrees, that is, the second group of first branch electrodes is perpendicular to the first group of first branch electrodes. Each of the third group of first branch electrodes extends from one of the second group of first branch electrodes and has a second predetermined angle with the second group of first branch electrodes, for example, 90 degrees. The second group of first branch electrodes and the third group of first branch electrodes may also be distributed in a windmill shape.

The pixel electrode 10 further includes a vertical electrode located in the peripheral region 10b, and the vertical electrode extends from one of the first branch electrodes 101. The vertical electrode of the peripheral region 10b is the same as the vertical electrode of the peripheral region 10b in the pixel electrode 10 shown in FIG. 3, and will not be described in detail herein for brevity.

Compared with the design of the pixel electrode shown in FIG. 3, the pixel electrode in this embodiment is more conducive to the liquid crystals in the middle region to form a suitable pretilt angle, and is more favorable for alignment stability.

Embodiment 3

Figure 7:
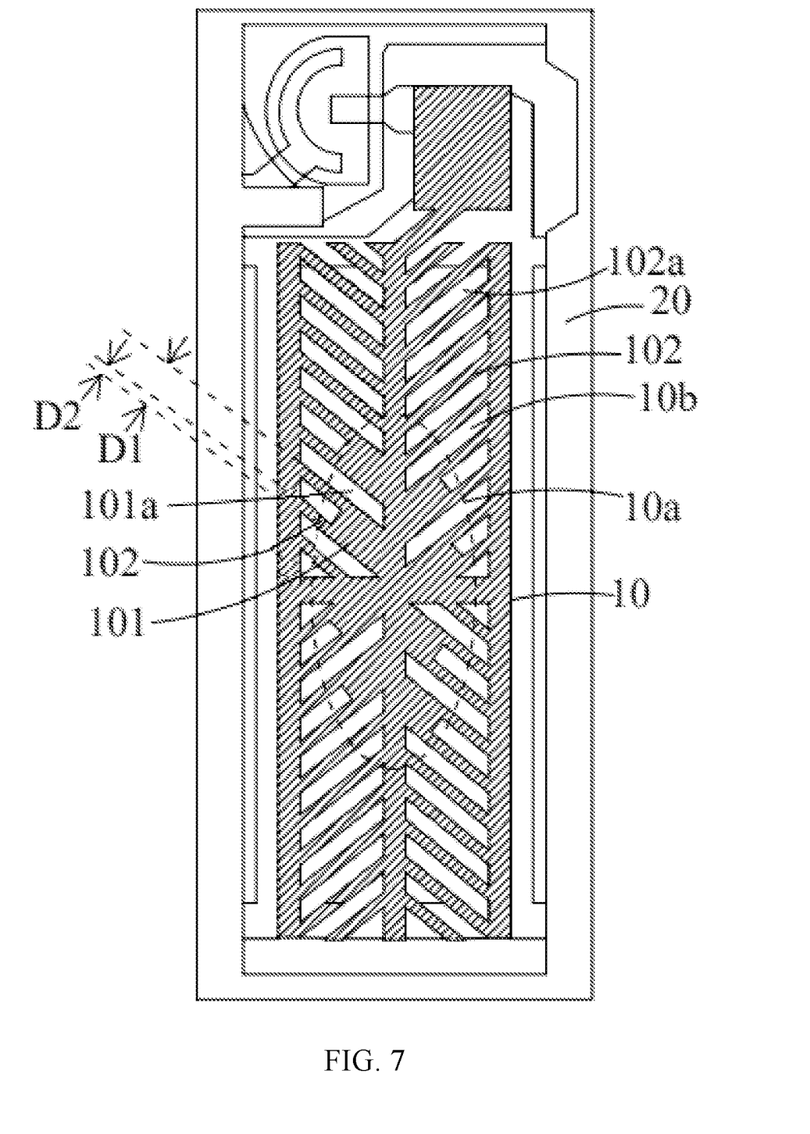
FIG. 7 is a top view of a liquid crystal display panel according to Embodiment 3 of the present application.

As shown in FIG. 7, FIG. 7 is a top view of a liquid crystal display panel according to Embodiment 3 of the present application. The liquid crystal display panel shown in Embodiment 3 is substantially similar to the liquid crystal display panel in Embodiment 1, except that the inner edge of the light shielding electrode 20 near the pixel electrode 10 is a straight edge, and the edge of the pixel electrode 10 near the light shielding electrode 20 is also straight edge.

In this embodiment, in the middle region 10a of the pixel electrode 10, the width D1 of each of the first branch electrodes is greater than the width D2 of each of the second branch electrodes 102, so that the force of the electric field formed between the first branch electrode 101 and the common electrode is greater than the force of the electric field formed between the second branch electrode 102 and the common electrode. On the one hand, in a liquid crystal alignment process of liquid crystal display panel, the electric field force applied to the liquid crystals in the middle region of the pixel electrode is greater than the electric field force applied to the liquid crystals in the peripheral region of the pixel electrode, and the pretilt angle formed by the liquid crystals in the middle region of the pixel electrode is relative great, which is beneficial to stabilize the liquid crystals in the middle region of the pixel electrode earlier during driving the liquid crystal display panel. On the other hand, when the liquid crystal display panel is driven by an operation voltage, the force of the electric field formed between the first branch electrode and the common electrode applied to the liquid crystals with the first pretilt angle in the middle region of the pixel electrode is greater than the force of the electric field formed between the second branch electrode and the common electrode applied to the liquid crystals with the second pretilt angle in the peripheral region of the pixel electrode, which is more conducive to stabilizing the liquid crystals in the middle region of the pixel electrode earlier. In addition, compared to the pixel electrode shown in FIG. 1, the pixel electrode of this embodiment also has the advantages of large aperture ratio and avoiding a steep slope of the voltage-transmittance (V-T) curve.

Figure 8:
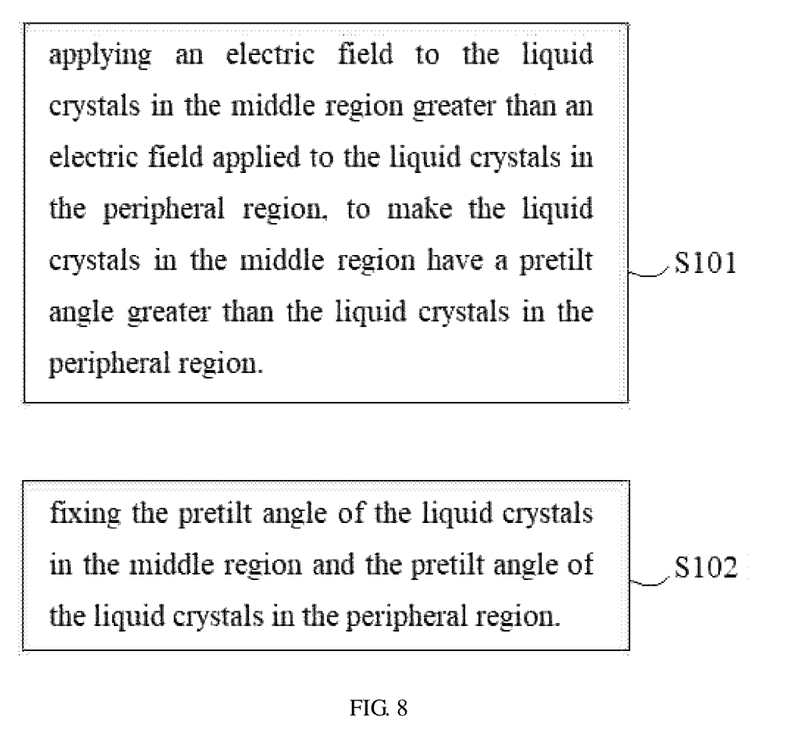
FIG. 8 is a schematic flowchart of a method of manufacturing a liquid crystal display panel according to the present application.

Referring to FIG. 8, FIG. 8 is a schematic flowchart of a method of manufacturing a liquid crystal display panel of the present application. The liquid crystal display panel includes an array substrate, a color filter substrate, and liquid crystals. The array substrate and the color filter substrate are oppositely arranged. The array substrate includes a pixel electrode, and the color filter substrate includes a common electrode. The pixel electrode and the common electrode are disposed oppositely. The liquid crystals are located between the pixel electrode and the common electrode. The pixel electrode has a middle region and a peripheral region located around the middle region. A plurality of first branch electrodes are provided in the middle region, and a plurality of second branch electrodes are provided in the peripheral region of the pixel electrode. The width of the first branch electrode is greater than the width of the second branch electrode. The manufacturing method includes the following steps:

S101: applying an electric field to the liquid crystals in the middle region greater than an electric field applied to the liquid crystals in the peripheral region, to make the liquid crystals in the middle region have a pretilt angle greater than the liquid crystals in the peripheral region.

Specifically, a first voltage is applied to the pixel electrode and a second voltage is applied to the common electrode. The liquid crystals provided in the middle region of the pixel electrode is formed to have a first pretilt angle under an action of the electric field formed by the first voltage applied by the first branch electrode and the second voltage applied by the common electrode, and the liquid crystals disposed corresponding to the peripheral region of the pixel electrode is formed to have a second pretilt angle under an action of the electric field formed by the first voltage applied by the second branch electrode and the second voltage applied by the common electrode. The first pretilt angle is greater than the second pretilt angle.

Since the first branch electrode has a large width, the force of the electric field between the first branch electrode and the common electrode is greater than the force of the electric field between the second branch electrode and the common electrode, so that the first pretilt angle of the liquid crystals provided corresponding to the middle region of the pixel electrode formed under the action of the electric field is greater than the second pretilt angle of the liquid crystals provided corresponding to the peripheral region of the pixel electrode under the action of the electric field.

S102: fixing the pretilt angle of the liquid crystals in the middle region and the pretilt angle of the liquid crystals in the peripheral region.

Specifically, by ultraviolet light incident from the color filter substrate side, the liquid crystals disposed corresponding to the middle region of the pixel electrode are formed on the alignment layer of the array substrate and have a first pretilt angle, and the liquid crystals disposed corresponding to the peripheral region of the pixel electrode are formed on the alignment layer of the array substrate have a second pretilt angle. The specific alignment process uses a common process, which is not described in detail herein for brevity.

In this embodiment, a ratio of a sum of the areas of the plurality of first branch electrodes to a sum of the areas of the plurality of second branch electrodes is greater than 0 and less than 1.

In this embodiment, the liquid crystal display panel further includes a light-shielding electrode. The light-shielding electrode and the pixel electrode are disposed on a same plane, and the light-shielding electrode includes a concave edge close to the pixel electrode and recessed relative to the pixel electrode.

In this embodiment, the pixel electrode includes a convex edge close to the light-shielding electrode and matching the concave edge.

Specific examples are used in this document to explain the principles and implementation of the present invention. The descriptions of the above embodiments are only for understanding the method of the present invention and its core ideas, to help understand the technical solution of the present application and its core ideas, and a person of ordinary skill in the art should understand that it can still modify the technical solution described in the foregoing embodiments, or equivalently replace some of the technical features. Such modifications or replacements do not depart the spirit of the corresponding technical solutions beyond the scope of the technical solutions of the embodiments of the present application.

What is claimed is:

1. A liquid crystal display panel, comprising a pixel electrode and liquid crystals, wherein
the pixel electrode comprises a middle region and a peripheral region located at a periphery of the middle region, the liquid crystals disposed corresponding to the middle region have a first pretilt angle, the liquid crystals disposed corresponding to the peripheral region have a second pretilt angle, and the first pretilt angle is greater than the second pretilt angle,
wherein a plurality of first branch electrodes are in the middle region of the pixel electrode, a plurality of second branch electrodes are in the peripheral region of the pixel electrode, and a width of each of the first branch electrodes is larger than a width of each of the second branch electrodes; and
wherein the middle region and the peripheral region of the pixel electrode are divided into a plurality of domains, at least one of the first branch electrodes located in a same one of the domains extends to form at least two of the second branch electrodes, and each of the second branch electrodes extended from the first branch electrodes has one side flush with one side of the first branch electrodes.

2. The liquid crystal display panel according to claim 1, wherein a ratio of a sum of areas of the plurality of first branch electrodes to a sum of areas of the plurality of second branch electrodes is greater than 0 and less than 1.

3. The liquid crystal display panel according to claim 1, wherein the pixel electrode comprises a vertical electrode and a horizontal electrode perpendicular to the vertical electrode, and each of the first branch electrodes extends from the horizontal electrode or/and the vertical electrode.

4. The liquid crystal display panel according to claim 1, wherein the plurality of first branch electrodes comprise a first group of the first branch electrodes and a second group of the first branch electrodes, each of the first group of the first branch electrodes extends outward from a center of the pixel electrode, and each of the second group of the first branch electrodes extends from the first group of the first branch electrodes.

5. The liquid crystal display panel according to claim 4, wherein the first group of the first branch electrodes comprises four first branch electrodes extending outward from the center of the pixel electrode, and an angle between adjacent ones of the first group of the first branch electrodes is equal to 90 degrees.

6. The liquid crystal display panel according to claim 1, further comprising a light-shielding electrode, wherein the light-shielding electrode is disposed on a same plane as the pixel electrode and located on opposite sides of the pixel electrode, and the light-shielding electrode comprises a concave edge close to the pixel electrode and recessed relative to the pixel electrode.

7. The liquid crystal display panel according to claim 6, wherein the pixel electrode comprises a convex edge close to the light-shielding electrode and matching the concave edge.

8. The liquid crystal display panel according to claim 6, wherein the liquid crystal display panel further comprises a data line located on a side of the light-shielding electrode, the data line is disposed corresponding to the light-shielding electrode, and an orthographic projection of the data line on the liquid crystal display panel is located in an orthographic projection of the light-shielding electrode on the liquid crystal display panel.

9. The liquid crystal display panel according to claim 6, wherein the concave edge comprises a first inclined straight line segment, a second inclined straight line segment, and a first circular arc segment connecting the first inclined straight line segment and the second inclined straight line segment, the first inclined linear segment and the second inclined linear segment respectively correspond to opposite ends of the pixel electrode, and the first circular arc segment corresponds to the middle region of the pixel electrode.

10. The liquid crystal display panel according to claim 9, wherein an angle between the first inclined straight line and a horizontal line or an angle between the second inclined straight line segment and the horizontal line is greater than or equal to 45 degrees and less than 90 degrees.

11. A method of manufacturing a liquid crystal display panel, wherein the liquid crystal display panel comprises a pixel electrode and liquid crystals, the pixel electrode comprises a middle region and a peripheral region located at a periphery of the middle region, and the manufacturing method comprises the following steps:
applying an electric field to the liquid crystals in the middle region greater than an electric field applied to the liquid crystals in the peripheral region, to make the liquid crystals in the middle region have a pretilt angle greater than the liquid crystals in the peripheral region; and
fixing the pretilt angle of the liquid crystals in the middle region and the pretilt angle of the liquid crystals in the peripheral region,
wherein a plurality of first branch electrodes are in the middle region of the pixel electrode, a plurality of second branch electrodes are in the peripheral region of the pixel electrode, and a width of each of the first branch electrodes is larger than a width of each of the second branch electrodes; and
wherein the middle region and the peripheral region of the pixel electrode are divided into a plurality of domains, at least one of the first branch electrodes located in a same one of the domains extends to form at least two of the second branch electrodes, and each of the second branch electrodes extended from the first branch electrodes has one side flush with one side of the first branch electrodes.

12. The method of manufacturing the liquid crystal display panel according to claim 11, wherein a ratio of a sum of areas of the plurality of first branch electrodes to a sum of areas of the plurality of second branch electrodes is greater than 0 and less than 1.

13. The method of manufacturing the liquid crystal display panel according to claim 11, wherein the pixel electrode comprises a vertical electrode and a horizontal electrode perpendicular to the vertical electrode, and each of the first branch electrodes extends from the horizontal electrode or/and the vertical electrode.

14. The method of manufacturing the liquid crystal display panel according to claim 11, wherein the plurality of first branch electrodes comprise a first group of the first branch electrodes, the first group of the first branch electrodes comprises four first branch electrodes extending outward from the center of the pixel electrode, and an angle between adjacent ones of the first group of the first branch electrodes is equal to 90 degrees.

15. The method of manufacturing the liquid crystal display panel according to claim 11, wherein the liquid crystal display panel further comprises a light-shielding electrode, the light-shielding electrode is disposed on a same plane as the pixel electrode and located on opposite sides of the pixel electrode, and the light-shielding electrode comprises a concave edge close to the pixel electrode and recessed relative to the pixel electrode.

16. The method of manufacturing the liquid crystal display panel according to claim 15, wherein the pixel electrode comprises a convex edge close to the light-shielding electrode and matching the concave edge.

17. The method of manufacturing the liquid crystal display panel according to claim 15, wherein the concave edge comprises a first inclined straight line segment, a second inclined straight line segment, and a first circular arc segment connecting the first inclined straight line segment and the second inclined straight line segment, the first inclined linear segment and the second inclined linear segment respectively correspond to opposite ends of the pixel electrode, and the first circular arc segment corresponds to the middle region of the pixel electrode.

* * * * *